WITNESSES:
Oliver Williams
Harry G. Saunders

INVENTOR
Edwin Coupland Shaw
BY
Edward Davis
ATTORNEY

UNITED STATES PATENT OFFICE.

EDWIN COUPLAND SHAW, OF AKRON, OHIO, ASSIGNOR TO B. F. GOODRICH COMPANY, OF AKRON, OHIO, A CORPORATION OF OHIO.

VEHICLE-WHEEL RIM.

No. 910,868.

Specification of Letters Patent.

Patented Jan. 26, 1909.

Application filed March 27, 1906. Serial No. 308,281.

*To all whom it may concern:*

Be it known that I, EDWIN COUPLAND SHAW, a citizen of the United States, and a resident of the city of Akron, county of Summit, and State of Ohio, have invented certain new and useful Improvements in Vehicle-Wheel Rims, of which the following is a specification, reference being had to the accompanying drawings, which form a part thereof.

My invention relates to that class of vehicle wheel rims adapted for use with tires of resilient materials, and more particularly to rims adapted for use with tires designed to be applied and detached at will, and comprises an annular rim adapted to seat upon the wheel felly and to be secured thereto by riveting or other suitable means, a tire flange mounted upon a removable ring, and means for retaining the removable tire ring in operative position.

The object of my invention is to provide suitable means for retaining a removable tire flange upon a rim in such a manner that the said tire flange may be easily and quickly applied or removed.

Figure 1:
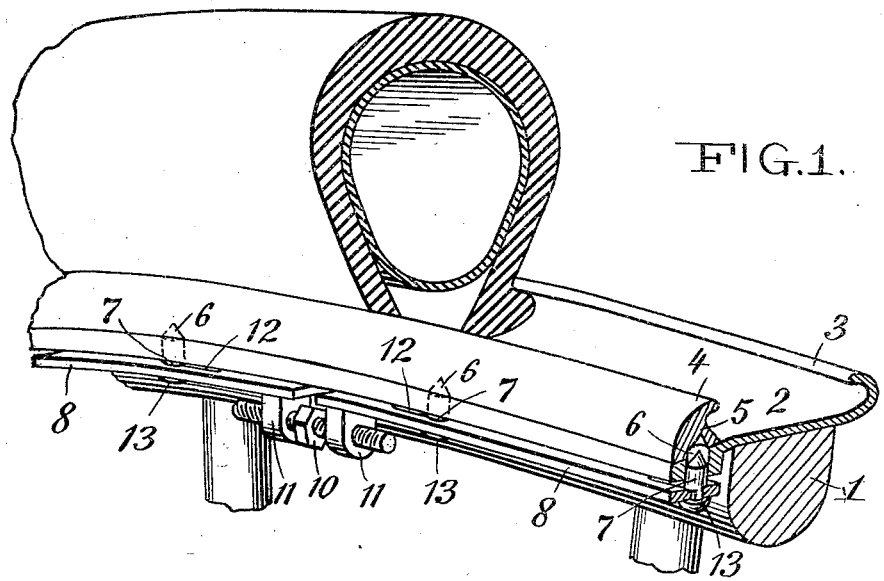
Figures 2, 3:
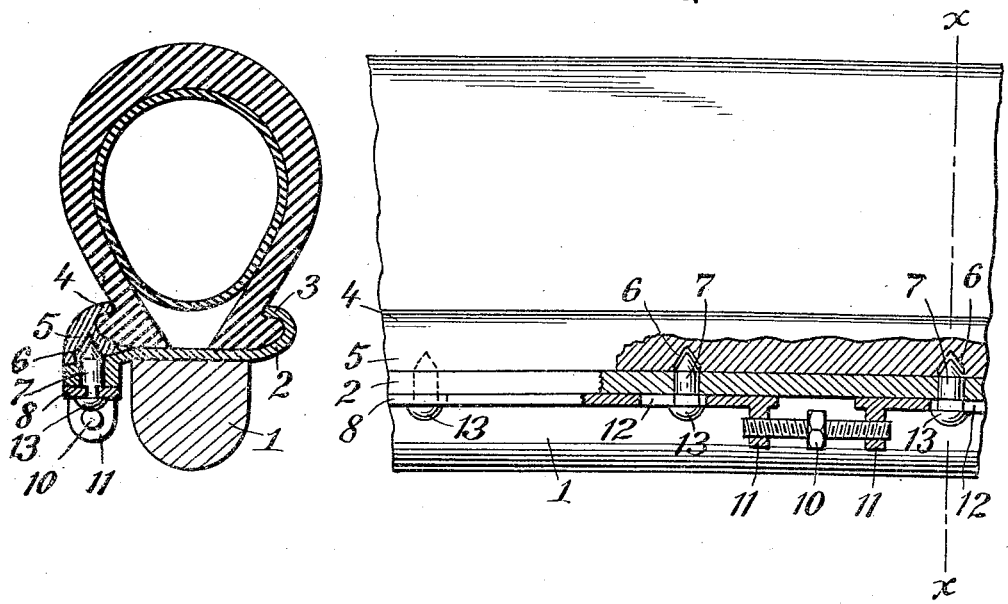

Referring to the drawings, Figure 1 is a perspective view of a section of a tire, rim and felly, embodying my improvements, showing the general method of using them. Fig. 2 is a side elevation of the device, parts being broken away to show details of construction. Fig. 3 is a cross section taken along the line X X of Fig. 2, showing the general form of the rim, removable flange and retaining means.

Like reference numerals designate like parts throughout the several figures.

In Figs. 1, 2 and 3, 1 is the wheel felly and 2 an annular rim adapted to be secured thereon by riveting or other suitable means. Along one edge of this rim is a permanent tire flange 3, preferably formed thereon. This flange, as shown in the drawings, is of the form adapted for use with clencher tires, being outwardly, upwardly and inwardly turned to grasp and hold beads formed upon the tire casing, but it is obvious that the form of this flange may be altered at will to adapt the rim for use with tires of other forms. The opposite edge of the rim 2 is left flat or preferably inclined slightly downward, and is adapted to form a seat for a removable tire flange 4. This removable tire flange is formed upon an endless ring 5, the base portion of which is shaped to fit accurately upon the rim in such a manner that the flange 4 is properly situated to retain the tire. When this portion of the rim is inclined downward, the base portion of the endless ring must be beveled correspondingly.

At suitable intervals in the base portion of the ring 5 I provide a plurality of sockets 6, 6, etc., and at similar intervals in the portion of the rim upon which the endless ring seats I provide perforations having a diameter equal to that of the sockets. These perforations and sockets are designed to receive a plurality of pins 7, 7 which have a length sufficient to project through the rim and into the endless ring sockets. To enable these pins to be more easily inserted, I prefer to make their extremities conical and to shape the inner ends of the socket correspondingly, which secures the additional advantage that only a small amount of the metal composing the endless ring need be cut away, which tends to conserve the strength of said ring. Various methods of applying and removing these pins may be employed, although I prefer to use the method shown in Figs. 1 to 3. A transversely split ring 8 is provided, having a length slightly less than the distance about the under-surface of the rim or of that portion of the rim against which the endless ring seats. The terminals of this ring are attached by some suitable means which will enable them to be drawn together or forced apart at will, such as that shown in the drawings, in which a turn-buckle 10 is passed through the studs 11, 11, extending downwardly from the terminals of the said split ring. At suitable intervals in this split ring are cut a series of slots 12, 12, the intervals between them corresponding to the intervals between the sockets before-mentioned. Within these slots are placed the pins 13, 13 in such a manner that they cannot be removed therefrom, but are capable of longitudinal movement relatively thereto. As shown in the drawings, the simplest method of accomplishing this is to provide the pins with necks of a width substantially equal to the width of the slots. The shafts of the pins are of greater diameter, as are also their heads, so that these pins are held securely within the slots, but may move longitudinally therein. In my preferred construction, as shown in the drawings, these necks are formed by oppositely disposed grooves, so that the said necks have a length greater than their width, and greater stability is thus secured, owing to the fact that the pins are held from rotation.

The mode of operation of my device is as follows: The parts being dismounted, the tire is applied to the rim and made to seat against the permanent tire flange 3. The endless ring is then applied, the sockets beforementioned being made to register with the perforations in the rim. The split ring 8 is next sprung into place beneath the edge of the rim, and the pins, which, as before explained, are permanently secured to said split ring, are forced through the perforations into the sockets. By means of the turn-buckle the terminals of the split ring are forced apart, thus expanding the split ring until it seats solidly against the rim and forces the pins firmly into position. This longitudinal movement of the ring is permitted by the fact that the pins are capable of longitudinal movement in the slots, as heretofore explained.

The usefulness of my device is not limited to a structure having an endless removable tire flange, but may be employed in combination with other locking means in structures having the removable tire flange formed upon a cross split ring.

Obviously both tire flanges may be made similarly removable by a mere duplication of parts, or if desired the tire flange 3 may also be formed upon an endless ring and an annular flange provided along that edge of the rim, in which case both flanges may be removed and replaced by flanges adapted for use with tires of other forms.

Having described my invention what I claim is:

1. In combination with a wheel rim a removable flange ring and means for retaining said ring upon said rim, said means comprising studs projecting through holes in the rim and ring, and an annular band carrying said studs.

2. In combination with a wheel rim having a removable flange ring and means for retaining said ring upon said rim, said means comprising studs projecting through holes in the rim and ring, and a split annular band for carrying said studs adapted to seat against the under surface of the portion of the rim beneath the removable flange.

3. In combination with a vehicle wheel rim having a removable flange, a plurality of pins adapted to pass through perforations in the rim into sockets in the base portion of the removable flange, said pins being slidably mounted in a split annular band adapted to seat against the under-surface of the portion of the rim beneath the removable flange.

4. Means for securing a removable tire flange upon the rim of a vehicle wheel consisting of a plurality of pins adapted to extend upwardly through perforations in the rim into sockets in the base of the removable flange, a cross split annular band adapted to seat beneath the said rim, and means for expanding and contracting said band, the said pins being mounted in a plurality of slots in said band and capable of longitudinal movement in said slots as said band is expanded or contracted.

5. In a vehicle wheel rim the combination of a tire flange formed upon an endless removable ring, a plurality of sockets in the base of said ring, perforations in said rim registering with said sockets when the endless ring is in the operative position, an annular cross split band adapted to seat against the under-surface of the rim beneath the endless ring, a turn-buckle connecting the terminals of said band and adapted to expand or contract it, and a plurality of pins slidably mounted in longitudinal slots in said band and adapted to pass through said perforations and into said sockets when said band is expanded.

6. A vehicle wheel comprising a rim forming a tire seat provided along and near one side thereof with a plurality of openings, an endless tire-holding device mounted on said rim, and an expansible ring positioned within said rim provided with means to extend through said openings and constitute abutments for preventing lateral displacement of said tire-holding device.

7. A vehicle wheel rim forming a tire seat provided with a plurality of openings, an endless tire-holding device mounted on said rim, and an annular spring element within said rim carrying means arranged to extend through said openings and constitute an abutment for preventing lateral displacement of said tire-holding device.

8. A vehicle wheel comprising a rim constituting a tire seat provided with a plurality of alined openings, an endless tire-holding device mounted on said rim, and an annular spring element within said rim carrying means to extend through said openings and constitute an abutment for preventing lateral displacement of said tire-holding device.

9. A vehicle wheel comprising a rim forming a tire seat provided with a circumferentially-arranged series of openings, an endless tire-holding device mounted on said rim, and a self-expansible ring positioned within said rim and carrying means to extend outwardly through said openings and constitute abutments for preventing lateral displacement of said tire-holding device.

10. A vehicle wheel comprising a rim constituting a tire seat with a circumferentially-arranged series of openings, an endless tire-holding device mounted on said rim, an annularly-formed locking element within said rim provided with means to extend through said openings and form abutments for preventing lateral displacement of said tire-holding device, and a keeper to retain said locking element in position.

EDWIN COUPLAND SHAW.

Witnesses:
CHARLES CROSS GOODRICH,
WALTER KEADY MEANS.